(12) United States Patent
Kullin

(10) Patent No.: US 9,885,385 B2
(45) Date of Patent: Feb. 6, 2018

(54) SPACER DEVICE, TOROIDAL ROLLER BEARING AND METHOD

(71) Applicant: Arne Lars Jonas Kullin, Landvetter (SE)

(72) Inventor: Arne Lars Jonas Kullin, Landvetter (SE)

(73) Assignee: AKTIEBOLAGET SKF, Gothenburg (SE)

( * ) Notice: Subject to any disclaimer, the term of this patent is extended or adjusted under 35 U.S.C. 154(b) by 19 days.

(21) Appl. No.: 14/931,892

(22) Filed: Nov. 4, 2015

(65) Prior Publication Data

US 2016/0131183 A1    May 12, 2016

(30) Foreign Application Priority Data

Nov. 7, 2014  (SE) .................................. 1451330-3

(51) Int. Cl.
| | | |
|---|---|---|
| F16C 19/40 | (2006.01) | |
| F16C 33/37 | (2006.01) | |
| F16C 43/06 | (2006.01) | |
| F16C 23/08 | (2006.01) | |

(52) U.S. Cl.
CPC ............. F16C 19/40 (2013.01); F16C 23/08 (2013.01); F16C 33/3706 (2013.01); F16C 43/06 (2013.01)

(58) Field of Classification Search
CPC ......... F16C 33/37–33/374; F16C 19/40; F16C 43/06; F16C 23/08; F16C 33/3704
See application file for complete search history.

(56) References Cited

U.S. PATENT DOCUMENTS

| | | | | |
|---|---|---|---|---|
| 7,963,702 B2* | 6/2011 | Ozu | .................. | F16C 19/26 384/520 |
| 8,523,451 B2* | 9/2013 | Ozu | .................. | F16C 19/26 384/551 |
| 8,814,436 B2* | 8/2014 | Wendeberg | ............ | F16C 19/40 29/898.06 |
| 2009/0252448 A1* | 10/2009 | Ozu | .................. | F16C 19/26 384/551 |

FOREIGN PATENT DOCUMENTS

| | | |
|---|---|---|
| JP | 2007092983 A | 4/2007 |
| JP | 2007255536 A | 10/2007 |

* cited by examiner

*Primary Examiner* — Alan B Waits
(74) *Attorney, Agent, or Firm* — Bryan Peckjian; SKF USA Inc. Patent Dept.

(57) ABSTRACT

A spacer device for roller elements of a toroidal roller bearing includes an inner ring and an outer ring. The toroidal roller bearing allows for axial and angular displacement between the inner and outer rings. The spacer device comprises a first roller element-contacting surface and a second roller element-contacting surface on opposite sides thereof. First and second roller-contacting surfaces are arranged to separate two adjacent roller elements in a tangential direction of the toroidal roller bearing when the spacer device is in use. Each of the first and second roller element-contacting surfaces has a concave shape adapted to conform to respective convex contacting surfaces of the roller elements. The spacer device comprises end members that have projections that extend outwards from first and second roller-contacting surfaces and which are arranged to extend at least partly over the ends of two adjacent roller elements when the spacer device is in use.

8 Claims, 6 Drawing Sheets

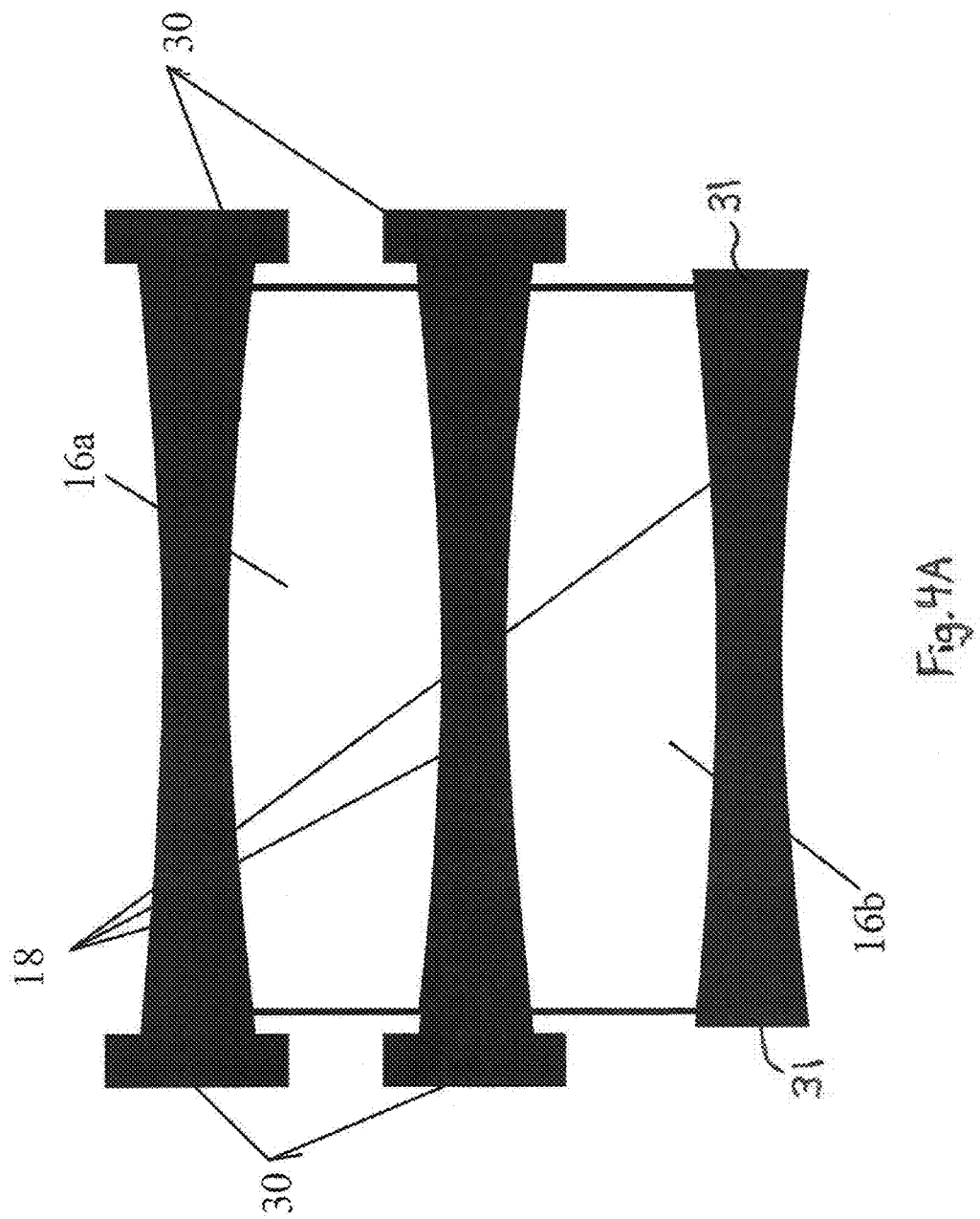

SPACER DEVICE, TOROIDAL ROLLER BEARING AND METHOD

CROSS REFERENCE TO RELATED APPLICATION

This is a Non-Provisional Patent Application, filed under the Paris Convention, claiming the benefit of Sweden (SE) patent application No. 1451330-3, filed on 7 Nov. 2014 (7 Nov. 2014), which is incorporated herein by reference in its entirety.

TECHNICAL FIELD

The present invention concerns a spacer device for roller elements in a toroidal roller bearing, and a toroidal roller bearing comprising such a spacer device. The present invention also concerns a method for manufacturing a toroidal device comprising such a spacer device.

BACKGROUND OF THE INVENTION

Toroidal roller bearings, such as CARB® toroidal roller bearings, are typically used for their ability of allowing both axial and angular displacement with respect to the outer ring and the inner ring of the toroidal roller bearing. This is enabled by the curved construction of the inner and outer rings' raceways which are adapted to conform to the curved shape of the roller elements, as described in European patent No. EP 0175858 for example. Hence, toroidal roller bearings combine self-aligning capability with axial displacement ability.

In order to maintain and support the roller elements in a toroidal roller bearing it is known to provide a cage to separate adjacent roller elements from each other in the tangential direction of the toroidal roller bearing, which restricts the movements of the roller elements in relation to each other and prevents roller-to-roller contact between the roller elements.

International Publication No. WO 2012/0044222 discloses a spacer device for roller elements in a toroidal roller bearing. The spacer device comprises a first roller-contacting surface and a second roller-contacting surface, each having a concave shape adapted to conform to respective convex contacting surfaces of the toroidal roller elements and at least one axial end portion which is elastically deformable so that the assembly of the toroidal bearing may be facilitated.

SUMMARY OF THE INVENTION

An object of the invention is to provide an improved spacer device for roller elements in a toroidal roller bearing, such as CARB® toroidal roller bearing, having an inner ring and an outer ring, wherein the toroidal roller bearing allows for axial and angular displacement between the inner ring and the outer ring, which spacer device enables efficient separation of the roller elements.

This object is achieved by a spacer device that comprises a first roller element-contacting surface and a second roller element-contacting surface on opposite sides thereof, which first and second roller-contacting surfaces are arranged to separate two adjacent roller elements in a tangential direction of the toroidal roller bearing when the spacer device is in use, i.e. when the spacer device is mounted in a toroidal roller bearing. Each of the first and second roller element-contacting surfaces has a concave shape adapted to conform to respective convex contacting surfaces of the roller elements. The spacer device comprises end members that have projections that extend outwards from first and second roller-contacting surfaces and which are arranged to extend at least partly over the ends of two adjacent roller elements when the spacer device is in use, and thereby limit the axial movement of roller elements.

The present invention is based on the insight that the shape of the outer ring raceway of a toroidal roller bearing geometrically prevents the rollers from excessive skew, i.e. rotation of the roller elements' rotational axis around an axis perpendicular to the raceway. Due to the geometrical prevention of skew in toroidal roller bearings, spacer devices in a toroidal roller bearing do not need to be dimensioned with strength as a priority. Furthermore, by providing spacer devices for roller elements in toroidal roller bearings which are adapted to conform to the rolling surfaces of the roller elements, the number of roller elements, and consequently the load bearing capabilities, may be enhanced in the toroidal roller bearing while enabling improved and efficient assembly. In other words, the spacer device is advantageous in that it allows for assembly of an increased number of roller elements which typically leaves less available space for intermediately arranged spacer devices. Hence, in a toroidal roller bearing comprising the spacer device according to the present invention, the carrying capacity of the bearing may be increased by increasing the number of rollers. For example, substantially the same carrying capacity as a full complement toroidal roller bearing, but without roller-to-roller contact, may be provided.

During operation in a toroidal roller bearing, the spacer device supports and separates the roller elements and thereby avoids roller-to-roller wear between adjacent roller elements and the contact between the spacer device and the roller elements allows for a build-up of a lubricating oil film. The oil film build-up is generated by the effective non-zero velocity in the interface between a roller element-contacting surface of the spacer device and the associated rolling surface of a roller element. In other words, the effective velocity on an oil fragment between a spacer device and a roller element will not be opposite and equal, as in the case with roller-to-roller contact. Hence, the spacer device facilitates for an increased number of roller elements in the bearing which increases, or maximizes, the load bearing properties while providing efficient and durable operation due to oil film build-up.

According to an embodiment of the invention the spacer device may comprise any suitable material. It does not necessarily have to comprise elastically deformable material but can instead comprise non-elastically deformable material.

According to an embodiment of the invention the spacer device comprises at least one recess. Such a recess reduces the material and weight of the spacer device and may provide a channel to guide or maintain lubricating oil to where it is needed.

According to an embodiment of the invention the spacer device comprises an opening that extends from the first roller element contacting-surface to the second roller element-contacting surface, in a tangential direction of the toroidal roller bearing when the spacer device is in use, and the opening is located at the centre of the spacer device where the tangential distance between the first and second roller element-contacting surfaces is smallest. In this way the thinnest and most fragile section of a spacer device in the tangential direction may advantageously be avoided, thereby improving the durability and stability of the spacer device.

The opening allows roller elements to be arranged with minimized tangential distance between each other, wherein portions of the contacting surface of a roller element will extend into the opening during operation. Substantially zero tangential distance between the contacting surfaces at the tangentially widest sections of the roller elements may thus be provided. The tangential distance may at least be substantially reduced. Alternatively, depressions may be provided in one or both the roller element-contacting surfaces of the spacer device.

The present invention also concerns a toroidal roller bearing that comprises at least one spacer device according to any of the preceding claims. The toroidal roller bearing may be a sealed toroidal roller bearing. The toroidal roller bearing may be used in automotive, wind, marine, metal producing applications and any other machine applications. For example, the toroidal roller bearing may be used in paper machines, continuous casters, fans and blowers, crushers and grinding mills, industrial transmissions, conveyors, and hydraulic motors and pumps.

The present invention further concerns a method for inserting at least a final roller element or a final spacer device into a toroidal roller bearing having an inner ring, an outer ring, roller elements and a plurality of spacer devices according to any of the embodiments of the present invention inserted between adjacent roller elements, wherein the toroidal roller bearing allows for axial and angular displacement between the inner ring and the outer ring. The spacer device namely comprises a first and second roller element-contacting surface on opposite sides thereof, which first and second roller-contacting surfaces are arranged to separate two adjacent roller elements in a tangential direction of the toroidal roller bearing, and wherein each of the first and second roller element-contacting surfaces has a concave shape adapted to conform to respective convex contacting surfaces of the roller elements. The spacer device also comprises end members that have projections that extend outwards from first and second roller-contacting surfaces and which are arranged to extend at least partly over the ends of two adjacent roller elements when the spacer device is in use. The method comprises the steps of tilting the inner ring of the toroidal roller bearing with respect to the outer ring whereby the distance between rolling elements is increased, and inserting a roller element between two spacer devices, or inserting a spacer device between two roller elements.

Such a method facilitates assembly of a toroidal roller bearing so that a spacer device according to the present invention may be inserted into the restricted available space between two closely arranged roller elements. Such a method is also advantageous in that it alleviates assembly and production considerations relating to damages occurring during manufacturing. Spacer devices can namely be mounted in a toroidal roller bearing without damaging the bearing's rings and roller elements.

BRIEF DESCRIPTION OF THE DRAWINGS

The present invention will hereinafter be further explained by means of non-limiting examples with reference to the appended schematic figures where;

FIG. 4A shows spacer devices with end members and a second spacer device without end members according to an embodiment of the invention provided between roller elements of a toroidal roller bearing from above.

It should be noted that the drawings have not been drawn to scale and that the dimensions of certain features have been exaggerated for the sake of clarity.

DETAILED DESCRIPTION OF EMBODIMENTS

Figure 1:
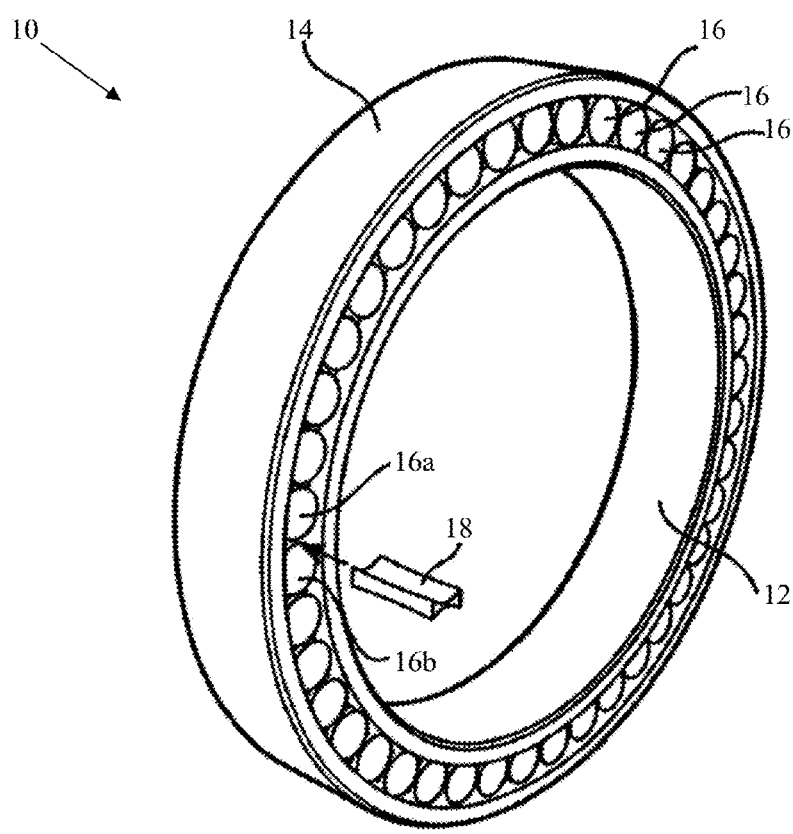
FIG. 1 shows a perspective view of a toroidal roller bearing according to the prior art.

FIG. 1 shows a toroidal roller bearing 10 according to the prior art. The toroidal roller bearing comprises an inner ring 12 and an outer ring 14, wherein the toroidal roller bearing 10 allows for axial and angular displacement between the inner ring 12 and the outer ring 14. A plurality of roller elements 16 are arranged between the inner ring raceway and the outer ring raceway.

The prior art toroidal roller bearing 10 comprises a plurality of spacer devices 18 comprising elastically deformable material which are to be inserted in between adjacent roller elements 16*a*, 16*b* in order to maintain the roller elements of the toroidal roller bearing in their intended relative position with respect to each other and prevent roller-to-roller contact between the roller elements 16.

Figure 2:
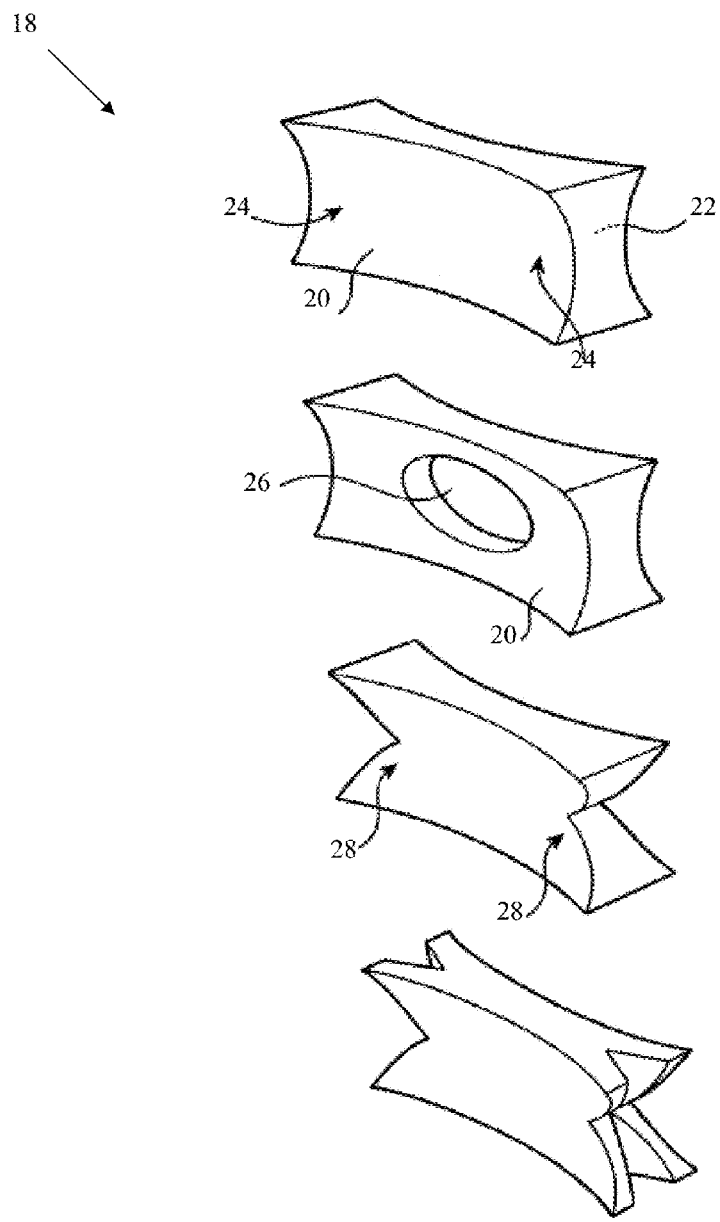
FIG. 2 shows spacer devices according to the prior art.

FIG. 2 shows several examples of spacer devices 18 according to the prior art. Each spacer device 18 comprises a first roller element-contacting surface 20 and a second roller element-contacting surface 22 on opposite sides thereof. The first roller element-contacting surface 20 and the second roller-contacting surface 22 are arranged to separate two adjacent roller elements 16*a*, 16*b* in a tangential direction of the toroidal roller bearing 10 when the spacer device 18 is in use. Each of the first roller element-contacting surface 20 and the second roller-contacting surface 22 has a concave shape 24 adapted to conform to respective convex contacting surfaces of the roller elements 16.

A spacer device 18 can comprise an opening 26 that extends from the first roller element contacting-surface 20 to the second roller element-contacting surface 22 and the opening 26 may be located at the centre of the spacer device 18.

A spacer device 18 can additionally, or alternatively comprise at least one recess 28 located on any part(s) of the spacer device 18. For example, the roller element-contacting surfaces 20, 22 of the spacer device may be provided with a plurality connected and/or non-connected recesses to facilitate lubrication and a local oil film-building.

Figure 3:
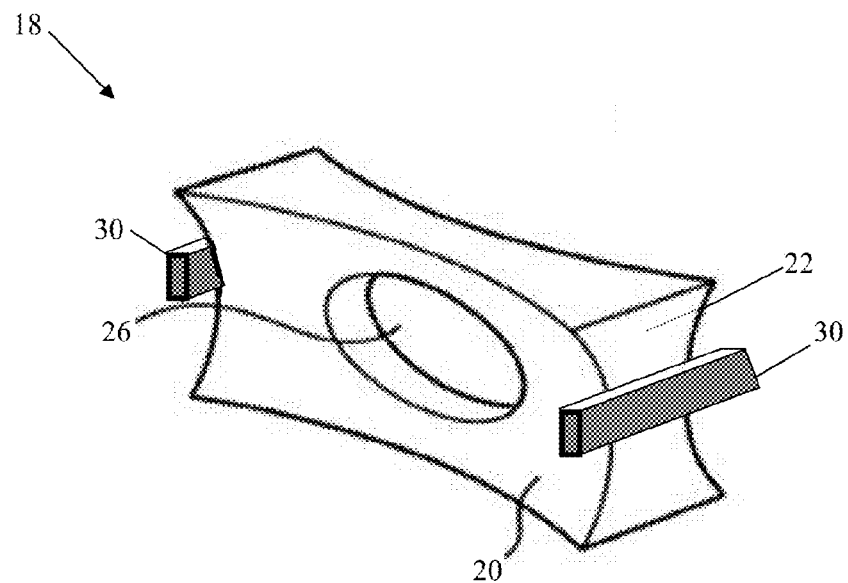
FIG. 3 shows a spacer device according to an embodiment of the invention.
Figure 4:
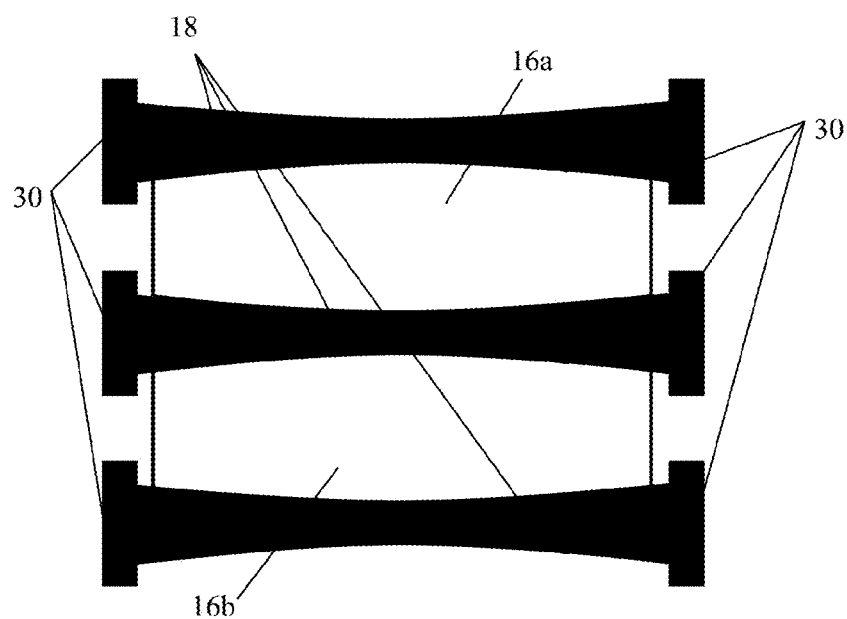
FIG. 4 shows spacer devices according to an embodiment of the invention provided between roller elements of a toroidal roller bearing from above.

FIG. 3 shows a spacer device 18 according to the present invention. It should be noted that a spacer device 18 according to the present invention can be of any suitable shape including all of the shapes shown in FIG. 2 and can have any texture that is suitable for oil-film building. The spacer device 18 according to the present invention differs from the spacer devices according to the prior art in that it comprises end members 30 that have projections that extend outwards from first roller-contacting surfaces 20 and the second roller-contacting surface 22 and which are arranged to extend at least partly over the ends of two adjacent roller elements 16*a*, 16*b* when the spacer device 18 is in use, as shown in FIG. 4. The spacer device 18 according to the present invention also differs from the spacer devices according to the prior art in that it does not necessarily have to be made from elastically deformable material in order to facilitate its mounting in a toroidal roller bearing 10, since spacer devices 18 according to the present invention can be mounted in a toroidal roller bearing 10 using a method according to the present invention.

The spacer device 18 according to the present invention may namely comprise any suitable material. For example, the spacer device 18 may comprise any of the following:
- a pressed sheet steel cage made from continuously hot-rolled low carbon sheet steel according to (DIN) EN 10111:1998 or stainless steel X5CrNi18-10 according to EN 10088-1:1995
- a machined steel cage made from non-alloyed structural steel of type S355GT (St 52) according to EN 10 025:1990 +A:1993. The surface of the machined steel cage may be treated to improve sliding and wear resistance properties
- a sheet brass cage comprising brass conforming to EN 1652:1997.
- a machined brass cage machined from a CW612N cast or wrought brass according to EN 1652:1997.
- a polymer cage (with or without glass fiber reinforcement) comprising Polyamide 66, Polyamide 4,6, Polyetheretherketone (PEEK), Phenolic resin, or
- other engineering polymer materials, light alloys or special cast iron.

The dimensions and geometry of a spacer device 18 may be adapted to a toroidal roller bearing 10 and the available internal space. The space available for a spacer device 18 positioned between and separating adjacent roller elements 16a, 16b in a toroidal roller bearing 10 may for example be defined as a length equal to or less than the roller element 16 axial length, a radial space equal to or less than the shape, or radial dimension, of the roller element 16 and a tangential space equal to or smaller than the total tangential roller-to-roller play divided by the number of roller elements 16 plus the off-centered tangential space between two roller element surfaces when the roller elements contact each other, i.e. the space intended to accommodate the axial end portions of the spacer device 18. By adapting, and/or limiting, the dimensions of the spacer device 18, the design options of toroidal roller bearing arrangements increase. A spacer device 18 according to the present invention may be adapted to avoid contact with the inner or outer raceways of the toroidal roller bearing 10 although this is not necessary.

FIG. 4 shows two adjacent roller elements 16a, 16b and three spacer devices 18 according to an embodiment of the present invention from above. It can be seen that each spacer device 18 comprises end members 30 that have oppositely directed projections that extend at least partly over the ends of the two adjacent roller elements 16a, 16b between which each spacer device 18 is inserted. It should be noted that the end members 30 of the spacer devices 18 do not need to press against the ends of the roller elements 16. There is preferably some play, i.e. an axial gap, between the end members 30 and the ends of the roller elements 16 so that the roller elements 16 are not decelerated when the toroidal roller bearing 10 is in use.

The present invention also concerns a toroidal roller bearing 10, such as the one shown in FIG. 1 but comprising at least one spacer device according to the present invention. A spacer device 18 according to the present invention is preferably provided between every two adjacent roller elements 16a, 16b. However, as shown in FIG. 4A, a toroidal roller bearing 10 according to the present invention may comprise just one spacer device 18, or a plurality of spacer devices 18 evenly or unevenly distributed around the toroidal roller bearing 10. The toroidal roller bearing 10 may then comprise spacer devices 31 of any other suitable form that do not comprise end members 30 that have projections that extend outwards from their first and second roller-contacting surfaces 20, 22 and which are arranged to extend at least partly over the ends of two adjacent roller elements 16a, 16b, between adjacent roller elements 16a, 16b.

A toroidal roller bearing 10 according to the present invention may range in size from 10 mm diameter to a few meters diameter and have a load-carrying capacity from a few tens of grams to many thousands of tons. The toroidal roller bearing 10 according to the present invention may namely be of any size and have any load-carrying capacity.

The toroidal roller bearing 10 may for example be a CARB® toroidal roller bearing. A CARB® toroidal roller bearing is self-aligning like a spherical roller bearing, and axially free like a cylindrical or needle roller bearing. It accommodates misalignment and axial displacement within the bearing without inducing internal axial loads with virtually no increase in friction. This eliminates the need to compromise between a tight fit and axial freedom, permitting tight fits to be used to eliminate creep and fretting corrosion, which commonly occur with conventional bearing arrangements. The results are lower operating temperatures and reduced vibration levels and improvements in reliability, bearing and lubricant life and energy consumption.

The toroidal roller bearing 10 according to the present invention can be a sealed toroidal roller bearing. The open areas on the two axial end faces of the toroidal roller bearing 10 between the inner ring 12 and the outer ring 14 may comprise seals for preventing dust, dirt etc. from entering the bearing. The seals can also retain lubricant, such as oil or grease, in the bearing. The seals may for instance be made of a polymer or a metal. Using spacer devices according to the present invention results in there being more space available for seals compared to a conventional toroidal roller bearing having a cage.

Figure 5:
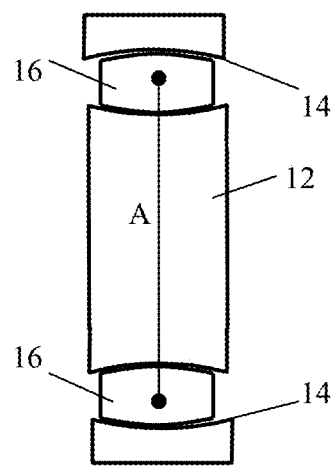
FIGS. 5, 6, and 7 show the steps of a method according to an embodiment of the present invention.
Figure 6:
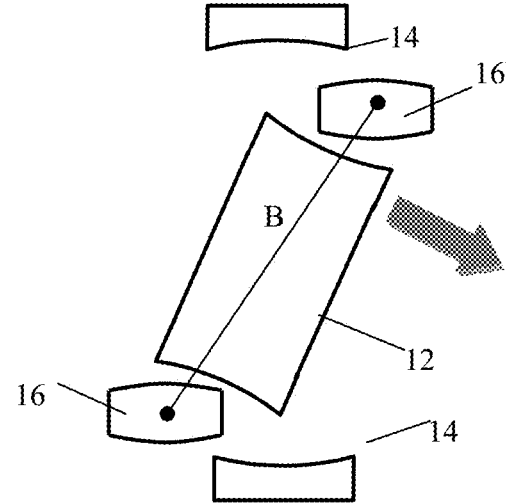
Figure 7:
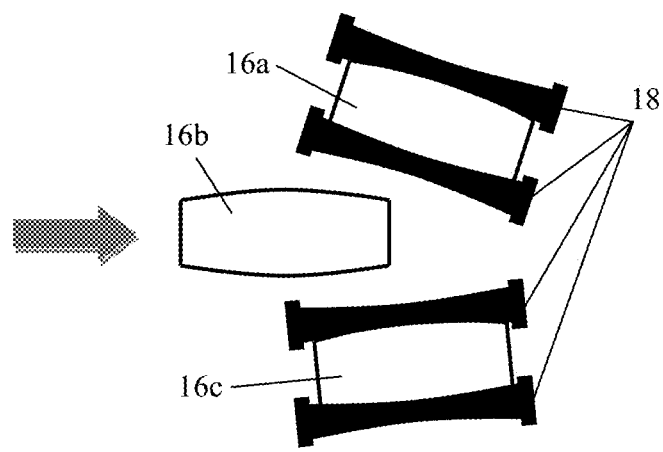

FIGS. 5-7 show the steps of a method for inserting at least a final roller element 16 or a final spacer device 18 into a toroidal roller bearing 10 having an inner ring 12, an outer ring 14, roller elements 16 and a plurality of spacer devices 18 according to an embodiment of the present invention inserted between adjacent roller elements 16a, 16b.

FIG. 5 shows a toroidal roller bearing 10 in which the inner ring 12 lies in the plane of the outer ring 14. The distance between the centers of opposing roller elements 16 is A.

In order to insert at least a final roller element 16 into a toroidal roller bearing 10 in assembling the toroidal roller bearing 10, the inner ring 12 of the toroidal roller bearing 10 is tilted with respect to the outer ring 14 so that the inner ring 12 no longer lies in the plane of the outer ring 14 as shown in FIG. 6, whereby the distance between rolling elements 16 is increased, i.e. distance B in FIG. 6 is greater than distance A in FIG. 5. Since extra space is thereby created between roller elements 16, a roller element 16 may consequently be more easily inserted between two already inserted spacer devices 18, or a spacer device 18 may be more easily inserted between two already inserted roller elements 16. Once all of the roller elements 16 have been inserted between the inner ring 12 and the outer ring 14 of the toroidal roller bearing 10, the inner ring 12 can be tilted back into alignment with the outer ring 14.

FIG. 7 shows that spacer devices 18 supporting already inserted roller bearings 16a and 16c may be moved apart to create more space between spacer elements 18 in order to facilitate the insertion of at least a final roller element 16b.

The method according to the present invention may of course also be used to facilitate the removal and replacement of a worn or damaged roller element 16 or spacer device 18.

The optimum length of the end members 30 of a spacer element 18 for a particular size of toroidal roller bearing 10 can be calculated or experimentally determined to ensure that they will facilitate both the assembly of the toroidal roller bearing 10 and that they will keep its roller elements 16 in place when in use.

Further modifications of the invention within the scope of the claims would be apparent to a skilled person.

What is claimed is:

1. A toroidal roller bearing, comprising:
   an inner ring;
   an outer ring; and
   at least one spacer device, each of the at least one spacer device comprising:
      a first roller element-contacting surface;
      a second roller element-contacting surface on an opposite side thereof; and
      end members that have projections that extend outwards from first roller-contacting surface and the second roller-contacting surface,
   wherein the toroidal roller bearing allows for axial and angular displacement between the inner ring and the outer ring,
   wherein the first roller-contacting surface and the second roller-contacting surface are arranged to separate two adjacent roller elements in a tangential direction of the toroidal roller bearing when the at least one spacer device is in use,
   wherein each of the first roller element-contacting surface and the second roller element-contacting surface has a concave shape adapted to conform to respective convex contacting surfaces of the roller elements,
   wherein the projections are arranged to extend at least partly over the ends of two adjacent roller elements when the at least one spacer device is in use, and wherein, the spacer device is configured to not contact the inner ring and to not contact the outer ring, the end members allow the inner ring and the outer ring to displace at least one of axially and angularly without the end members contacting either of the outer ring, the inner ring, or any fixed extensions thereof that would impede the at least one of the axial and angular displacement of the inner ring and the outer ring; and
   at least one second spacer device that does not have end members thereon is located between two adjacent roller elements such that the at least one spacer device is not evenly distributed circumferentially in the toroidal roller bearing.

2. The toroidal roller bearing according to claim 1, wherein the at least one spacer device is formed out of cast brass.

3. The toroidal roller bearing according to claim 1, wherein the at least one spacer device further comprises at least one recess.

4. The toroidal roller bearing according to claim 1, wherein the at least one spacer device further comprises an opening that extends from the first roller element contacting-surface to the second roller element-contacting surface,
   wherein the opening is located at the centre of the at least one spacer device.

5. A method for inserting at least one of a final roller element or a final spacer device into a toroidal roller bearing having:
   an inner ring;
   an outer ring;
   roller elements; and
   a plurality of spacer devices inserted between adjacent roller elements, each spacer device comprising a first roller element-contacting surface and a second roller element-contacting surface on an opposite side thereof and end members that have projections that extend outwards from first and second roller-contacting surfaces,
   wherein the toroidal roller bearing allows for axial and angular displacement between the inner ring and the outer ring,
   wherein the first roller-contacting surface and the second roller-contacting surface are arranged to separate two adjacent roller elements in a tangential direction of the toroidal roller bearing, and
   wherein each of the first roller element-contacting surface and the second roller element-contacting surface has a concave shape adapted to conform to a respective convex contacting surface of the roller elements,
   wherein the projections are arranged to extend at least partly over the ends of two adjacent roller elements when the plurality of spacer devices are in use, and wherein, the end members allow the inner ring and the outer ring to displace at least one of axially and angularly without the end members contacting either of the outer ring, the inner ring, or any fixed extensions thereof that would impede the at least one of the axial and angular displacement of the inner ring and the outer ring, the spacer device is configured to not contact the inner ring and to not contact the outer ring,
   at least one second spacer device that does not have end members thereon is located between two adjacent roller elements such that the at least one spacer device is not evenly distributed circumferentially in the toroidal roller bearing;
   the method comprising steps of:
   tilting the inner ring of the toroidal roller bearing with respect to the outer ring whereby the distance between rolling elements is increased; and
   one of:
   a) inserting a roller element between two spacer devices, or
   b) inserting a spacer device between two roller elements.

6. The method according to claim 5, wherein the spacer device comprises cast iron.

7. The method according to claim 5, wherein the spacer device comprises at least one recess.

8. The method according to claim 5, the spacer device further comprising an opening that extends from the first roller element contacting-surface to the second roller elementcontacting surface at the centre of the spacer device.

* * * * *